May 1, 1923.
H. O. POHRT
TOOL HOLDER
Filed Dec. 19, 1922
1,453,947
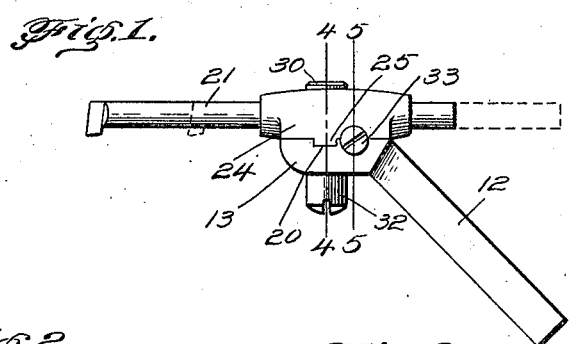
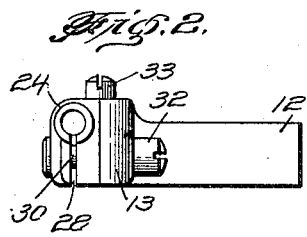
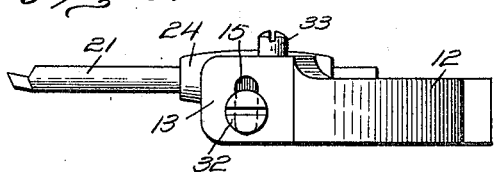
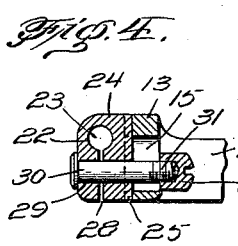
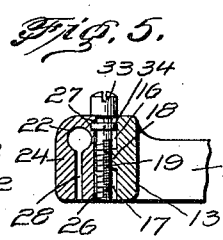
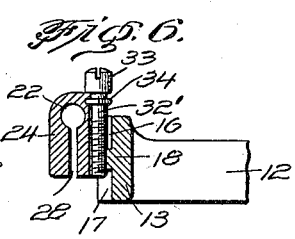
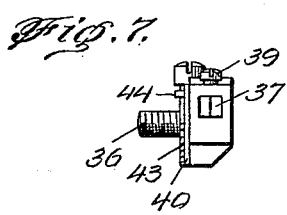
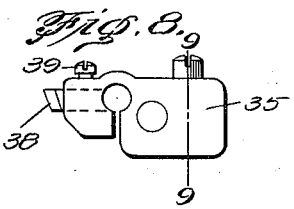
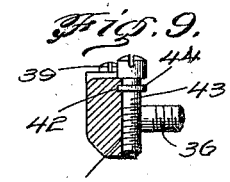
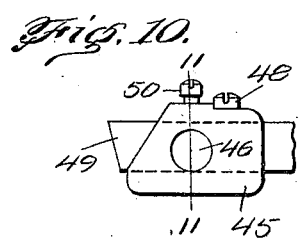
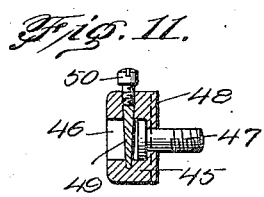
INVENTOR.
Henry O. Pohrt.
BY
Geo. F. Kimmel  ATTORNEY.

Patented May 1, 1923.

1,453,947

UNITED STATES PATENT OFFICE.

HENRY O. POHRT, OF FLINT, MICHIGAN.

TOOL HOLDER.

Application filed December 19, 1922. Serial No. 607,785.

*To all whom it may concern:*

Be it known that I, HENRY O. POHRT, a citizen of the United States, residing at Flint, in the county of Genesee and State of Michigan, have invented certain new and useful Improvements in Tool Holders, of which the following is a specification.

This invention relates to an adjustable tool holder for metal working tools, particularly tools for boring, threading and cutting off, but it is to be understood that a tool holder in accordance with this invention can be employed for any purposes wherein it is found applicable, and the invention has for its object to provide in a manner as hereinafter set forth, a device of such class having means for not only shifting the tool carrying element to adjust the tool to the desired position, but further for rigidly securing said element at the point to which it has been shifted whereby the tool will be maintained in its adjusted position.

Further objects of the invention are to provide an adjustable tool holder primarily designed for use in connection with lathe work and which is comparatively simple in its construction and arrangement, strong, durable, efficient and convenient in its use, readily assembled, and comparatively inexpensive.

With the foregoing and other objects in view, the invention consists in the novel construction, combination and arrangement of parts as hereinafter more specifically described, and illustrated in the accompanying drawings, wherein is shown an embodiment of the invention, but it is to be understood that changes, variations and modifications can be resorted to which fall within the scope of the claims hereunto appended.

In the drawings wherein like reference characters denote corresponding parts throughout the several views:—

Figure 1 is a top plan view of a tool holder in accordance with this invention, showing the adaptation thereof in connection with a boring bar.

Fig. 2 is a front elevation thereof.

Fig. 3 is a side elevation thereof.

Fig. 4 is a section on line 4—4 of Fig. 1.

Fig. 5 is a section on line 5—5 of Fig. 1, and which illustrates the tool carrying elements in normal position.

Fig. 6 is a view similar to Fig. 5, showing the tool carrying element in an adjusted position.

Fig. 7 is an end view,

Fig. 8 a side view, and,

Fig. 9 a sectional view of a modified form of tool carrying element.

Fig. 10 is a side elevation, and

Fig. 11 is a section on line 11—11 of Fig. 10 of another modified form of tool carrying element.

Referring to the drawings, Figs. 1 to 6, show the adaptation of the invention in connection with a boring bar. Figs. 7, 8 and 9, show the adaptation of the invention in connection with a threading tool, and Figs. 10 and 11 illustrate the adaptation of the invention in connection with a cutting off tool.

When the device is employed in connection with a boring bar, or a threading tool, or a cutting off tool, the same construction of slide post is employed, and the slide post is illustrated in Figs. 1, 2 and 3, and comprises a stem 12 formed with a head piece 13, the latter being formed with a vertically disposed slot 15, a pair of vertically disposed alining grooves 16, 17, separated by a lateral lug 18, provided with threads 19. The head piece 13 is furthermore provided with a vertically disposed groove 20 arranged to one side of the groove 17.

When the device is employed in connection with a boring bar, the latter being indicated at 21, positioned in a tool carrying element, as illustrated in Figs. 1, 2 and 3 of the drawings, the said element consists of a tool holder member 22, formed with a lengthwise opening 23, in which is mounted the boring bar 21, the latter extending forwardly and rearwardly with respect to the member 22. The member 22 is offset as at 24, and said offset portion 24, has a tongue 25, which seats in the groove 20. To one side of the tongue 25, the offset portion 24 is formed with a vertically disposed groove 26, which opposes the grooves 16 and 18. The wall of the groove 26, in proximity to its upper end, is provided with a pocket 27. The holding member 22, is split as at 28, and the split extends from the opening 23, to the bottom of said member 22. The member 22, below the opening 23, is formed with a transversely extending opening 29, which is intersected by the split 28, and mounted in said opening 29, is a headed clamping member 30, which projects through the slot 15, and has its inner end threaded as at 31, and mounted on said threaded end 31, is a clamping nut 32, which engages the head piece 13.

The clamping element 30 is employed for fixedly securing the holding member 22 to the head piece 13.

The holding member 22 is adjustable relatively to the head piece 13, through the medium of an adjusting screw 32', the latter being provided with a head 33, and has its stem formed in proximity to the head 33, but spaced therefrom, with a laterally disposed annular flange 34, which engages in the pocket 27. The adjusting screw 32' is mounted in the grooves 16, 17 and 26, and engages with the threads 19 of the lug 18, and by this manner of setting up the adjusting screw, with respect to the holding member 22 and head piece 13, when the screw 32', is actuated in one direction, the member 22 will be shifted, as illustrated in Fig. 6 of the drawings, and which action is caused by the engagement of the flange 34 in the pocket 27 and the threadingly engaging of the stem of the screw 32' with the threads of the lug 18.

Referring to Figs. 7, 8 and 9 of the drawings, in which is shown a modified form of tool carrying element, the latter comprises a tool holding member 35, carrying a clamping screw 36, which is adapted to extend through the opening 15, and carries a clamping nut on its inner end for the purpose of clamping the member 35 to the head piece 13. The member 35 is provided with a socket 37 for the reception of the tool 38, and which is engaged by a binding screw 39. The member 35 is furthermore provided with a tongue 40 adapted to engage in the groove 20, and said member 35 has a vertical groove 41, provided with a pocket 42. The adjusting screw employed in connection with the member 35, is indicated at 43, and is of the same construction as the screw 32'. A flange 44 is provided on the screw 43 which engages in the pocket 42. The operation of the screw 43 is the same as the operation of the screw 32'.

Referring to Figs. 10 and 11 of the drawings, which show another modified form of the tool carrying element, the latter comprises a tool holding member 45, formed with a countersunk opening 46, in which is mounted and from which extends a clamping screw 47, which performs the same function as the screw 36 and clamping element 30. The bolt 47 is adapted to extend through the opening 15 and carries on its threaded end a clamping nut for binding the member 45 to the head piece 13. The member 45 has a tongue 48, which seats in the groove 20 and is also provided with an adjusting screw 48 connected therewith in the same manner as the screw 43 is connected to the member 35 and the screw 32' to the member 22. The tool is indicated at 49 and a holding screw 50 is provided for maintaining the tool 49 in the member 45. The tool 49 intersects the opening 46 and the head of the bolt 47 is arranged inwardly with respect to the tool 49.

It will be pointed out that each of the tool carrying elements, is not only provided with a tongue adapted to be positioned in the groove 20, but each is provided at one side of the tongue, with a groove having a pocket in the wall thereof, for the reception of the flange of the adjusting screw. Irrespective of the type of tool carrying element, the adjusting means therefor is the same, and each of said elements is seated against and has its tongue extending into the groove 20, and is adjusted due to the engagement of the adjusting screw in the pocket of the element, and with the threads of the lug 18.

From the foregoing construction, it is obvious that a tool holder is set up, including means whereby the tool carrying element is fixedly secured in its shifted position, whereby the tool will be maintained in the position to which it has been adjusted, and that owing to the construction of the device, it requires the loosening of the tool carrying element with respect to the slide post, before said element can be adjusted relatively to the head piece 13, and that after adjustment, the tool carrying element can be quickly clamped in position to the head piece 13 as the clamping nut 32 is conveniently accessible, and although the preferred embodiment of the invention is as shown and described, yet it is to be understood that changes in the details of construction can be resorted to without departing from the spirit of the invention as claimed.

What I claim is:—

1. A tool holder comprising a head piece provided with a slot and further provided with a pair of alining grooves separated by a lug formed with threads, and a tool carrying element formed with a groove opposing said pair of grooves and having the wall thereof provided with a pocket, a shiftable means arranged in the grooves of said head piece and element and engaging said lug and further extended into said pocket for adjusting said element, and means carried by said element and extended through said slot for clamping the element to said head piece.

2. A tool holder comprising a head piece provided with a slot and further provided with a pair of alining grooves separated by a lug formed with threads, and a tool carrying element formed with a groove opposing said pair of grooves and having the wall thereof provided with a pocket, a shiftable means arranged in the grooves of said head piece and element and engaging said lug and further extended into said pocket for adjusting said element, and means carried by said element and extended through said slot for clamping the element to said head piece, said element and head piece having a tongue and groove connection.

3. A tool holder comprising a slotted head piece having its outer face formed with a plurality of grooves and with a lug provided with threads, a tool carrying member opposing said head piece formed with a tongue extending into one of the grooves of said head piece and further provided with a groove opposing said lug, the wall of the groove of said element having a pocket formed therein, a flanged and threaded adjusting member interposed between said head piece and element and threadably engaging with said lug and having its flange slidably mounted in said pocket, and means carried by said element and extending through the slot of the head piece for detachably clamping said element and head piece together.

In testimony whereof, I affix my signature hereto.

HENRY O. POHRT.